Sept. 15, 1953 E. L. C. WHITE 2,652,459
NEGATIVE FEED-BACK AMPLIFIER
Filed June 22, 1949
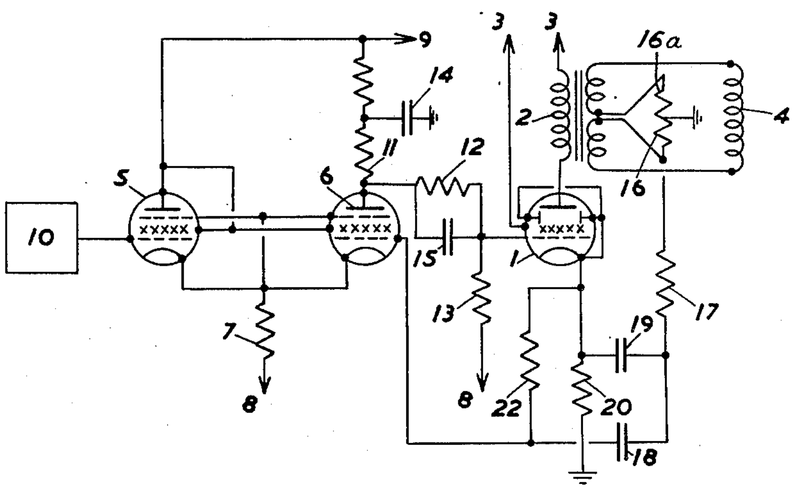
Inventor:
ERIC LAWRENCE CASLING WHITE
By J. O. Ollier,
Attorney Patented Sept. 15, 1953

2,652,459

UNITED STATES PATENT OFFICE 2,652,459

NEGATIVE FEED-BACK AMPLIFIER

Eric Lawrence Casling White, Iver, England, assignor to Electric & Musical Industries Limited, Hayes, England, a company of Great Britain Application June 22, 1949, Serial No. 100,694
In Great Britain June 30, 1948

5 Claims. (Cl. 179—171)

This invention relates to negative feedback amplifiers.

In negative feedback amplifiers which are required to amplify a wide range of frequencies, such for example as amplifiers utilised in scanning circuit arrangements for television equipment difficulty is sometimes experienced because the amplifier may include elements, for example, transformers, which cause a considerable phase shift of the higher frequency components relatively to the lower frequency components in said range of frequencies. This may result in the feedback becoming positive for the higher frequency components or possibly for the lower frequency components in some cases thereby rendering the amplifier liable to instability at the frequencies at which the feedback becomes positive.

The object of the present invention is to provide an improved negative feedback amplifier with a view to reducing or avoiding the aforesaid difficulty.

According to the present invention there is provided a negative feedback amplifier comprising a feedback path whereby signals of some frequencies can be fed from the output circuit of said amplifier to the input circuit thereof in such phase as to afford negative feedback, wherein said amplifier comprises an element which causes relative phase shift of signals of other frequencies and wherein means is provided for effectively preventing signals of said other frequencies from being fed from said path to afford feedback to said input circuit, and a second feedback path is provided from a point in said amplifier prior to said element whereby signals of said other frequencies can be fed to said input circuit in such phase as to afford negative feedback.

In order that the said invention may be clearly understood and readily carried into effect, the same will now be more fully described with reference to the drawing accompanying the specification wherein one example of a negative feedback amplifier in accordance with the present invention is diagrammatically illustrated.

Referring to the drawing, the amplifier illustrated is employed in a frame scanning circuit for a television transmitter and the amplifier comprises an output valve 1, shown as a beam tetrode valve, having its anode connected via the primary winding of a transformer 2 to a source 3 of positive potential of, say 200 volts positive, the frame scanning coils 4 of the television transmitter being connected across the secondary winding of the transformer 2. The valve 1 is driven by two valves 5 and 6, shown as pentodes, having a common cathode impedance 7 by means of which the cathodes are connected to a source 8 of negative potential of, say 300 volts negative. The anodes of the valves 5 and 6 are connected to a source 9 of positive potential of, say 300 volts positive to which the screen electrodes are also connected as shown. The control electrode of the valve 5 is arranged to have applied to it a sawtooth waveform potential of frame frequency from a suitable source indicated in block form at 10, while the anode of the valve 6 is connected to the control electrode of the valve 1 via a D. C. coupling circuit comprising resistances 11, 12 and 13 and condensers 14 and 15. The valves 5, 6 and 1 and the associated couplings therefore constitute a forward path to the coils 4 for signals applied to the amplifier from the source 10. A feedback resistance 16 is connected in series with the scanning coils 4 and one end of this resistance is grounded as shown and the other end is connected, via a series resistance 17 and a large blocking condenser 18, to the control electrode of the valve 6. The resistance 16 is connected in series with a resistance 16*a* to maintain balance in the circuit of the coils 4. The junction of the resistance 17 and the condenser 18 is coupled via a relatively small condenser 19 to the cathode of valve 1 a feedback resistance 20 being provided as shown in the cathode lead of the valve 1. The cathode of the valve 1 is also connected by a large resistance 22 to the control electrode of valve 6.

The circuit described operates in such manner that when a sawtooth waveform potential is applied to the control electrode of the valve 5 a substantially sawtooth waveform current is caused to flow in the scanning coils 4. A potential proportional to the current in the coils 4 is set up across the resistance 16 and the lower frequency components of this potential are in appropriate phase to afford negative feedback to the input of the amplifier on application to the control electrode of the valve 6, whereas the higher frequency components are relatively displaced in phase, due mainly to the transformer 2, such that they would afford positive feedback if applied to the control electrode of the valve 6. The lower frequency components of the potential variations at the upper terminal of the resistance 20 and those at the lower terminal (in the drawing) of the resistance 16 are therefore in the same phase but the higher frequency components thereof are in phase opposition, or have at least a component in phase opposition, since the resistance 20 is disposed prior to the transformer 2, that is to say the transformer is not effective to cause a relative phase shift of the higher frequency components of the potential set up across the resistance 20. Since the impedance of the condenser 19 is high for lower frequency components, such components from the lower terminal of the resistance 16 are but little attenuated at the junction of the resistance 17 and the condenser 19 while the corresponding components of the upper terminal of the resistance 20 are substantially attenuated. On the other hand, for the higher frequencies which undergo substantial phase shift in the transformer 2 the impedance of the condenser 19 is low and these signal components from the lower terminal of the resistance 16 are substantially attenuated at the junction of the resistance 17 and the condenser 19 while those from the upper terminal of the resistance 20 are but little attenuated. In effect, the feedback to the input circuit of the amplifier is derived from the lower terminal of the resistance 16 and from the upper terminal of the resistance 20 via filters having complementary frequency characteristics, that is to say the transmission characteristics of one of the feedback paths is the same as the attenuation characteristics of the other feedback path, this result being inherent in the direct connection of the two feed points by means of the resistance 17 and condenser 19 in series, as shown in the drawing. Moreover, the pass-bands of the separate feedback paths are such that the feedback is derived from the resistance 16 for frequency components not liable to undergo such phase shift in the transformer 2 as to give rise to oscillation whilst for higher frequency components the feedback is derived from the resistance 20. It is, moreover, arranged that the signals set up at both feed points have substantially the same amplitude so as to give the effect of feedback over the combined frequency ranges of the feedback paths as from a single feed point.

In the example illustrated the invention is also applied to the very low frequency components of the waveform, which also suffer undesired phase shifts in passing through the transformer, and to the D. C. component, which is not transmitted at all by the transformer. The very low frequency components are prevented from being fed back from the resistance 16 by means of the condenser 18, and they together with the D. C. component are fed to the control electrode of the valve 6 from the potential set up across the resistance 20, via the resistance 22 which is made sufficiently large so as to cause no substantial attenuation of the feedback potential components transmitted by way of the condenser 18. The D. C. and the very low frequency feedback serves to stabilise the D. C. level of the sawtooth waveform current in the valve 1 despite variations which may be effected in the amplitude thereof.

The circuit described is arranged to provide negative feedback from the resistance 16 over as wide a range of frequencies as possible without causing instability of the amplifier and further negative feedback is provided by the resistance 20 over a range of frequencies excluded from the feedback provided by the resistance 16, whereby negative feedback is provided over a range of frequencies sufficient to cover the significant frequency components of the sawtooth waveform with practically no liability to instability.

It will be appreciated that the invention is not limited to negative feedback amplifiers employed in scanning circuits for television apparatus. The invention may find general application to negative feedback amplifiers which are required to amplify signals having a wide range of frequencies.

What I claim is:

1. A thermionic valve amplifier comprising a thermionic valve having at least a cathode, a control electrode, and an output electrode, an input circuit for applying signals to be amplified to said control electrode, an output circuit including a transformer having a primary winding connected to said output electrode, filter means for applying signals from a point in said output circuit to said input circuit to afford negative feedback to said input circuit, an impedance in a space current path of said valve, and filter means for applying signals from one end of said impedance to said input circuit to afford negative feedback to said input circuit, said first and second filter means having complementary frequency characteristics with the pass-band of the first means in a frequency range in which feedback signals from said output circuit have appropriate phase to afford negative feedback to said input circuit, and with the pass-band of the second means in a frequency range in which signals from said output circuit would afford positive feedback if fed to said input circuit.

2. A thermionic valve amplifier comprising a thermionic valve having at least a cathode, a control electrode, and an output electrode, an input circuit for applying signals to be amplified to said control electrode, a transformer having a primary winding in circuit with said output electrode, an output circuit including a secondary winding of said transformer and a resistance in series with said secondary winding, filter means for applying signals set up across said resistance to said input circuit to afford negative feedback to said input circuit, a resistance in the cathode lead of said valve, and filter means for applying signals set up across said second resistance to said input circuit to afford negative feedback to said input circuit, said first and second filter means having complementary frequency characteristics with the pass-band of the first means in a frequency range in which feedback signals from said output circuit have appropriate phase to afford negative feedback to said input circuit, with the pass-band of the second means in a frequency range in which signals from said output circuit would afford positive feedback if fed to said input circuit, and said first and second resistances being dimensioned to set up feedback signals of substantially equal amplitudes at least at the change-over frequencies of said filter means.

3. A thermionic valve amplifier having a thermionic valve having at least a cathode, a control electrode and an output electrode, an input circuit for applying signals to be amplified to said control electrode, a transformer having a primary winding in circuit with said output electrode, an output circuit including a secondary winding of said transformer and a resistance in series with said secondary winding, a second resistance connected from one end of said first resistance to a point in said input circuit for feeding signals from said first resistance to said point to afford negative feedback to said input circuit, a third resistance in the cathode lead of said valve, and a condenser connected from the cathode end of said third resistance to said point in the input circuit for feeding signals from said third resistance to said input circuit to afford negative feedback to said input circuit, said resistances and said condenser being dimensioned to give attenuation of high frequency signals from said first resistance which would be liable to produce positive feedback due to phase shift caused by said transformer and to give complementary attenuation of low frequency signals from said third resistance.

4. An amplifier according to claim 3, comprising a further resistance connected from the cathode end of said third resistance to said point in the input circuit for feeding direct current and slowly varying signal components from said third resistance to said input circuit, said further resistance being dimensioned to cause little attenuation of signals transmitted via said second resistance or said condenser.

5. A negative feedback thermionic valve amplifier comprising an input circuit, an output circuit, and an amplifying path from said input circuit to said output circuit including an element which does not transmit direct current and which is liable to cause phase shift of signals, an impedance in said amplifying path prior to said element for setting up feedback signals free from phase shift due to said element, an impedance in said output circuit, each of said impedances being grounded at one end, the series combination of a condenser and a resistance connected from the other end of said first impedance to the other end of said second impedance with the condenser nearer said first impedance, a direct current blocking condenser connected from the junction of said first condenser and said resistance to said input circuit for feeding signals set up at said junction to said input circuit, said first condenser and said resistance being dimensioned to produce feedback to said input circuit mainly from said second impedance in a frequency range in which signals from said second impedance have a phase appropriate to afford negative feedback and to produce feedback to said input circuit mainly from said first impedance in a frequency range in which signals from said second impedance would produce positive feedback, and a second resistance connected from said other end of said first impedance to said input circuit to produce negative feedback of direct current and slowly varying signal components to said input circuit, said second resistance being dimensioned to cause little attenuation of feedback signals transmitted via said first condenser or said first resistance.

ERIC LAWRENCE CASLING WHITE.

References Cited in the file of this patent

UNITED STATES PATENTS

| Number | Name | Date |
|---|---|---|
| 2,167,367 | Meyers | July 25, 1939 |
| 2,230,819 | White | Feb. 4, 1941 |
| 2,239,773 | Bierwirth | Apr. 29, 1941 |
| 2,241,534 | Blumlein et al. | May 13, 1941 |
| 2,246,158 | Worcester, Jr. | June 17, 1941 |
| 2,256,072 | Bruck | Sept. 16, 1941 |
| 2,302,493 | Dome | Nov. 17, 1942 |
| 2,500,424 | Meyers | Mar. 14, 1950 |